May 20, 1952 N. KUTCHUKIAN 2,597,341
COMBINATION TIMING AND COMPUTING APPARATUS
Filed Aug. 28, 1946 4 Sheets-Sheet 1

INVENTOR
NOURHAN KUTCHUKIAN
By:
Haseltine, Lake & Co.
AGENTS

May 20, 1952    N. KUTCHUKIAN    2,597,341
COMBINATION TIMING AND COMPUTING APPARATUS
Filed Aug. 28, 1946    4 Sheets-Sheet 3

INVENTOR:
Nourhan Kutchukian
By: Haseltine Lake & Co
AGENTS

INVENTOR:
Nourhan Kutchukian
By: Hazeltine Lake & Co.
AGENTS.

Patented May 20, 1952

2,597,341

UNITED STATES PATENT OFFICE 2,597,341

COMBINATION TIMING AND COMPUTING APPARATUS

Nourhan Kutchukian, Bois-Colombes, France

Application August 28, 1946, Serial No. 693,602
In France September 1, 1945

19 Claims. (Cl. 161—1)

The rational management of a concern or a workshop requires that the managing personnel be accurately informed at all times as to various data such as planning and distribution of labour, allotment thereof, distribution of raw materials, removal of finished products, costs of manufacture, hourly wages, bonuses and so on. This requires the presence of a numerous staff in the planning and control offices and a material installation which is generally complicated, bulky and costly.

The present invention has for main object to provide, with a view to remedy for such drawbacks, a single apparatus to obtain at all times information as to the progress of work in a workshop, or in a plurality of workshops in a plant, the checking of work hours, the actual state of work in progress, and so on, so as to provide an operator with readily readable indications on the apparatus, and furthermore an automatic signalling means controlled by the apparatus itself and which provides for the transmission to distant locations, by means of visible or audible signals, of certain indications among those provided by said apparatus.

Another object of the invention is to provide a control board or table, upon which the operator has previously disposed a number of representative signs, and which travelled over by reading members adapted to read such signs, the relative movements of said reading members and said board being effected according to a pre-determined law of movement in relation to time, and the readings being transmitted to signalling devices.

Another object of the invention is to provide a cylinder driven in rotation and whereon are secured tubes which are preferably transparent, extending parallel to the generatrices of said cylinder, on which an operator has previously disposed material signs adapted to represent the working hours allotted to an individual worker or to a workshop; some of said signs being adapted to influence one reading member at least, comprising in combination a projector and a photo-electric cell; the whole being mounted upon a carriage movable in a direction parallel to the generatrices of said cylinder, under the action of a screw driven by a prime mover at a constant average speed, thus having a displacement which is proportional to time and parallel to the tubes carrying the signs adapted to influence said reading member, riding in front of it as a result of the rotation of the cylinder; the electric currents provided by the cell, after being amplified, controlling luminous or audible signals which are located at selected points and reminding the staff automatically and at a suitable time as to the indications carried by the cylinder, or controlling directly the operation of machines.

Another object of the invention is to provide the cylinder and the indication carrying tubes as being operative, the cylinder being at a stop, to provide further indications by comparison with other boards or tables comprised in the apparatus; said last mentioned boards may be rulers provided with graduations and either provided or not with measuring instruments or pointers, or further cylinders carrying multiple scales or abacuses, which may themselves be rotated in a direction parallel to the main cylinder and be stopped at a desired position, the reading of the indications being made by a mere comparison or by a measurement.

The invention has for other objects to provide an apparatus of the character described, wherein the scales necessary for the operation of the machine are photographically recorded on cinematograph films. Preferably two scales are photographed on the width of a standard film, which is thereafter cut in two along the longitudinal axis of the film so as to produce two separate scales.

The scales are inserted into channels secured to the machine in appropriate locations. The channels containing the scales are unitary either with fixed parts of the rotatable cylinder, or with parts unitary with the movable tubes, adjustment of said scales being effected at will by sliding them along said channels.

Another object of the invention is to provide an apparatus of the character described, wherein each set of scales corresponding to a worker in the workshop, or to a workshop in the plant, comprises at least five scales, two of which are carried by channels unitary with the movable cylinder, the three remaining scales being disposed in channels mounted on a structure slidable relatively to the two first-mentioned scales.

The fixed scales include a time scale and an efficiency scale. The three slidable scales include a time scale graduated according to the daily time schedule, a wage scale and a time scale graduated for indicating the total workhours effected in a week for instance.

Another object of the invention is to provide an apparatus of the character described, wherein graduated labels, the length of which is proportional to time, are cut out from wage-dockets and are secured, by gluing for instance, in suitable locations in front of the scales, whereby it is possible to read thereon the theoretical times granted for effecting predetermined operations as well as any gains or losses in time in the accomplishment thereof. The positioning of said various labels secured with respect to the scale enables a continuous reading of the wages due, and the displacement of the movable parts with respect to the fixed parts so as to produce registering of the time scales makes it possible to read, opposite an index, the efficiency relating to a worker or a workshop and thus enables rapid reckoning of the efficiency bonuses.

Another object of the invention is to provide an apparatus of the character described, wherein, in order to facilitate the displacement of the movable parts of the scales, an auxiliary driving fluid is used which is introduced into the machine by suitable means and actuates said movable parts.

A further object of the invention is to provide an apparatus of the character described, wherein the movable parts of the set of scales are constituted by tubes slidable in a direction parallel to the generatrices of the rotatable cylinder and are guided in such movement by suitably shaped supports made unitary with the cylinder by resilient attaching means.

A further object of the invention is to provide an apparatus of the character described, wherein the movable tube forms a cylinder opened at both ends and in which are disposed two pistons unitary with rods fixed by the ends thereof to lateral flanges forming the end walls of the rotatable tube-carrying cylinder.

The movable tube is slidable on both fixed pistons under the action of a pressure-fluid inlet between the piston head and the packing of the rod thereof, thereby determining the extent of advance of said cylinder on the side where said pressure fluid is admitted.

Movable stops, which may be made unitary through set screws with the piston rods, are operative to accurately determine the point where the tube is to be stopped.

A further object of the invention is to provide an apparatus of the character described, wherein the movable cylinders and the piston rods are formed of electrically conductive material, but the pistons themselves and the packings are made of insulating material, whereby the surfaces of the cylinders and of the piston rods may serve as the electrodes of condensers, the capacitance of which is variable according to the relative positioning of the cylinders with respect to the piston rods.

The invention has for further object to provide an apparatus of the character described, wherein a capacitance measuring instrument, such as a comparative measurement bridge with zero indicating means, which may advantageously be an indicator comprising a positionable electron stream, enables measurements to be made in conjunction with suitable contact means, and separately or in various combinations, of the capacitance values of the condensers carried by the machine. The apparatus thus provided gives at all times the aspect of the situation of work in progress.

The ensuing description, with reference to the accompanying drawings given by way of non-restrictive examples, will make clear in which manner the invention may be carried out.

Figures 1, 10, 11, 12:
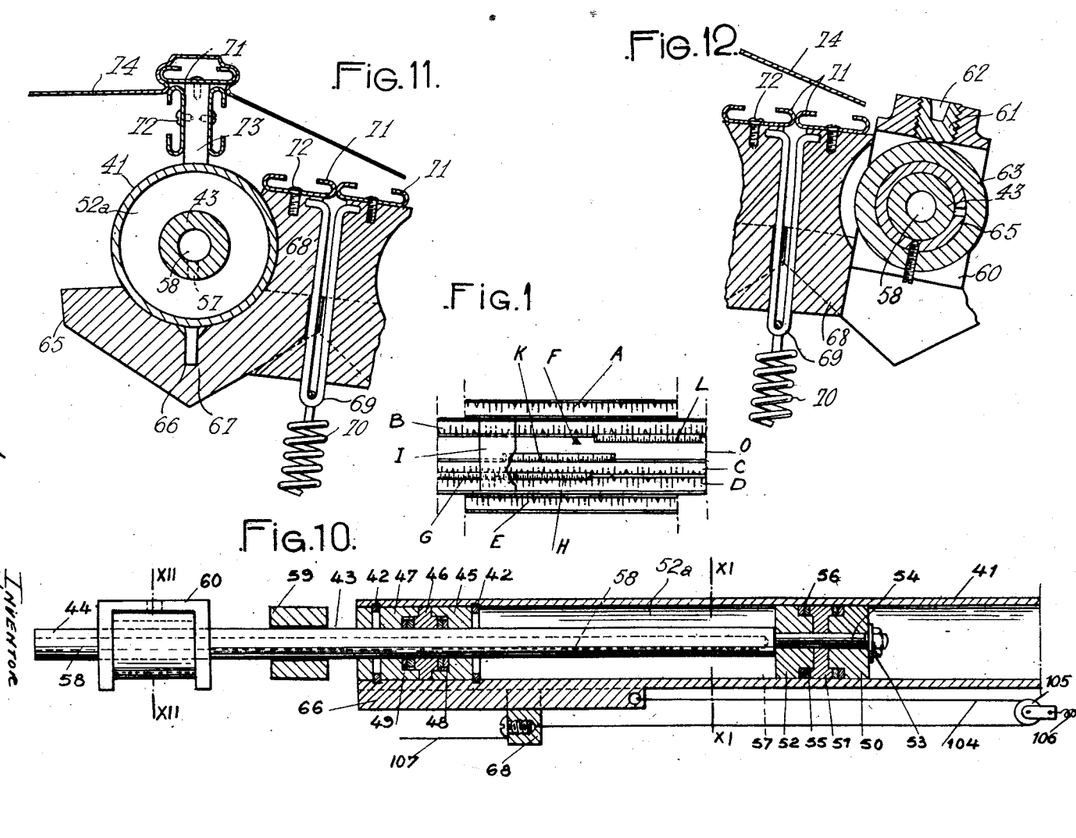
Fig. 1 is an explanatory diagram illustrating the fundamental working of an elementary apparatus according to the invention.
Fig. 10 shows in axial cross-section a movable tube with the piston, the packing of the rod and the adjustable abutment device.
Fig. 11 is a sectional view of Fig. 10 taken on line XI—XI.
Fig. 12 is a sectional view of Fig. 10 taken on line XII—XII.

The explanatory diagram illustrated in Fig. 1 shows the fundamental working of an elementary apparatus corresponding to a progressing operation, such as the successive works effected by one worker during a predetermined period of time.

Five scales A, B, C, D and E, are parallelly disposed, the scales A and E being stationary and the scales B, C and D carried by a slidable ruler O, being simultaneously adjustable with respect to said scales A and E and to each other. The scale A figures the efficiency of the worker and is graduated in positive and negative values from a zero facing a fixed mark F provided in the center of the ruler O. The scale E is a time scale continuously graduated according to the daily time schedule, for a week for example, the graduations noon and 2 p. m. registering as well as the graduations 6 p. m. and 8 a. m., so that the scale will not take into account the periods when no work is done. The scale B is a time scale graduated for indicating the total work-hours during said week. The scale C is similar to the scale E. The scale D is a salaries scale for indicating the normal wages earned by the worker during the hours for which he has efficiently worked in the course of the week.

Further, for each elementary operation is established a wage-docket, provided with the name or the mark of the worker to whom said operation is allotted.

Finally, a step for distributing raw materials, special tools and/or half fabricated objects is provided for each elementary operation, the time corresponding to said step being included in the time allotted for the preceding operation just before the starting of the operation to be performed.

Assuming that the worker is a new one and begins his work on a Monday morning; for the first elementary operation he must perform, he receives a wage-docket provided with three copies of different colours (white, blue and yellow), each copy having a separable label carrying graduations corresponding to that of the scale C. When the wage-docket is delivered to the worker the white label is cut out with a length corresponding to the time allotted for said first elementary operation. Said white label G is positioned between the scales C and D and secured by gluing, for example. During the working of said first elementary operation, a second elementary operation is allotted to the worker, a second white label H is positioned between the scales C and D so that its origin coincides with the end of the preceding white label G.

At the same time, an index I, white if the scales are black, black if the scales are white, and the length of which corresponds to the time necessary to supply the worker for said second elementary operation, is positioned over the first white label so that its end coincides with the end of said first label.

An optical sensing device comprising a photoelectric cell is continuously movable parallelly to the scales at a continuous speed corresponding to the scale of the time graduations. When said device meets optically said index I, the photoelectric cell is energized or deenergized thus providing the operation of a signal for indicating that the worker must be supplied for his next elementary operation.

When the worker has performed the first elementary operation, he cuts out on the corresponding wage-docket the blue or advance label, or the yellow or delay label, according as effective time is shorter or longer than allotted time, and writes the actual time at which ends said operation. The materials for performing the second elementary operation having been supplied to the worker during the time corresponding to the supplying step of said second operation, when he was performing the first operation, he can start immediately the second operation when said first operation is ended.

The blue label K or yellow label L is then positioned between the scales B and C so that its end coincides with the graduation C corresponding to the actual time at which the work is finished. At that time all the scales B, C and D are moved as a unit by means of the slidable ruler O so that the end of the white label G coincides with the actual ending time on the scale E. The efficiency of the worker for said first operation may be read directly on scale A in coincidence with the displaced mark F.

The last white label to be glued at the end of a week corresponds to the time when the wages are paid. The normal wage paid out is directly read on the wage scale C in registry with the end of the preceding white label, the related job of which is actually finished.

The reading of the efficiency scale A in accordance with mark F allows to determine the eventual efficiency bonus.

Figures 2, 3, 4, 5, 6, 7:
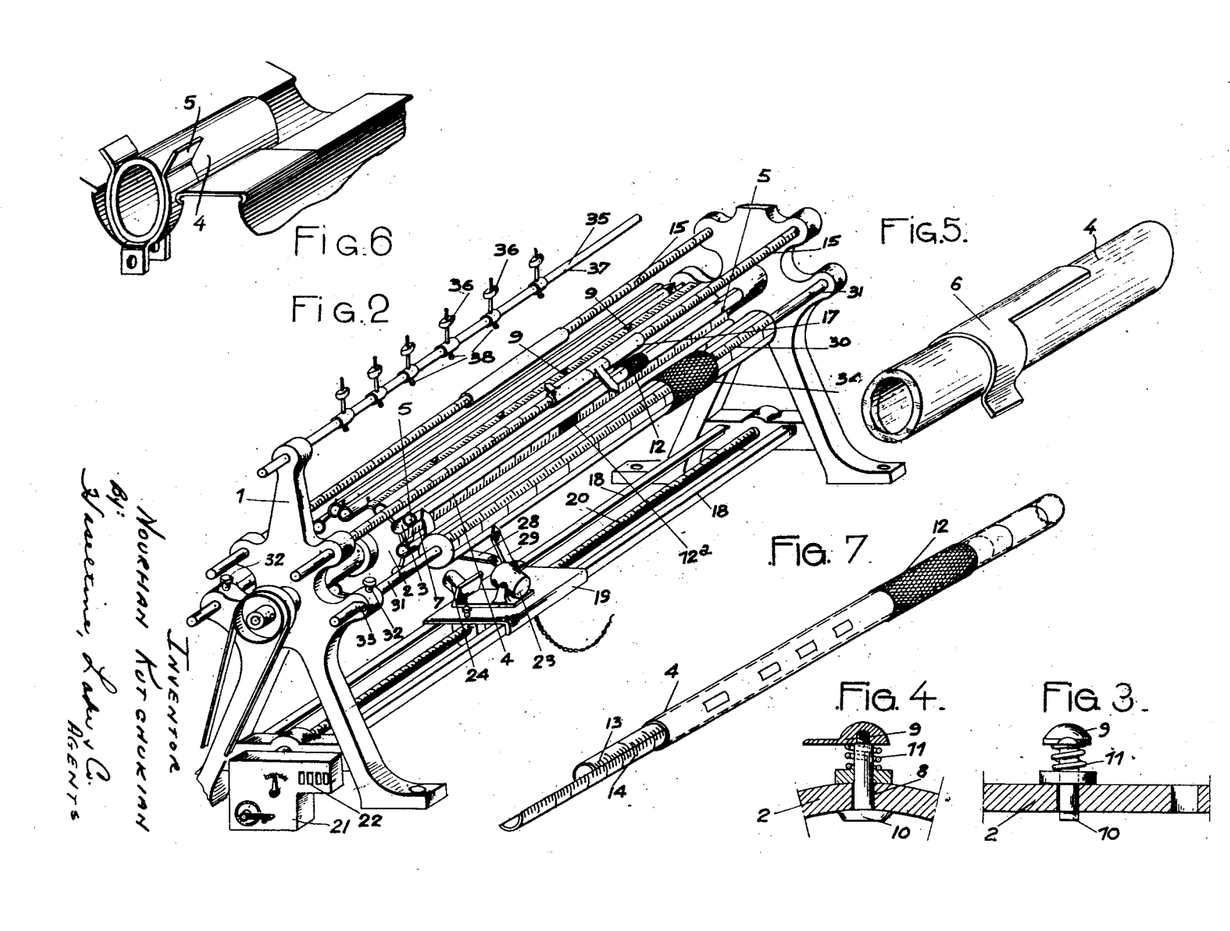
Fig. 2 is a general perspective view of the apparatus.
Fig. 3 is a side view illustrating a marker.
Fig. 4 is an elevational view of the marker.
Fig. 5 shows an indicating slider.
Fig. 6 shows a spring clamp for securing the tubes or rods.
Fig. 7 is a perspective view of a tube or rod provided with sliding scales.

The work remaining unfinished on said last white label is carried over to the beginning of the following week at the left of the scales by securing a new white label similar to said last white label so that the mark corresponding to that of said last label relating to the end of the preceding week registers the beginning of the scale C for the actual week. The wage scale D is positioned so that its zero mark coincides with the beginning of the new white label. The totalizing time scale B is positioned for its zero mark to coincide with the origin of the displaced scale C. The above described adjustments having been effected, the zero mark of the efficiency scale A is brought into registry with the displaced mark F. The apparatus comprises a frame 1 provided with bearings necessary for the rotation of the various members which are mounted thereon and on which are supported the driving engines. A grooved cylinder 2, preferably arranged horizontally, is formed with suitably shaped grooves 3 in a number equal to, or greater than, that of the workers to be controlled in the workshop, or of the workshops or offices to be controlled in the concern. Said cylinder is mounted on a spindle with which it is rotatable in the bearings provided on the frame, under the effect of a drive from a prime mover not illustrated, preferably electrical, which may be cotrolled and adjusted by the operator by means of variable resistors and switches.

The grooves 3 receive tubes or rulers 4, preferably made of a transparent material, retained in said grooves e. g. by spring clamps 5 shown in Fig. 6. Said tubes or rulers have a length greater than that of the cylinder for a purpose which will be explained below.

The fixation is such that the tube or ruler is held firmly in place without being liable to fall out while the cylinder is rotated, under the action of centrifugal force, but at the same time, said tube is displaceable by the operator manually in a direction parallel to the axis of the cylinder so as to bring it to a desired position.

On the ruler, there may be disposed markers or sliders 6, held on said ruler by means of spring clamps, said markers being, for example, such as shown in Fig. 5.

The portions 7 of the cylinder, which are comprised between the grooves 3, carry graduations and holes 8 making it possible to secure thereto the coloured markers 9, such as are shown in Figs. 3 and 4, for example, or indexes 12 providing for the release of the reading system.

Said markers are secured by inserting lugs 10 into the related hole 8 and compressing the spring 11, a rotation through an angle of 90° then ensuring a positive fixation; at that moment the lugs 10 are clamped against the inner side of the wall of the cylinder by the spring 11.

On the tubes or rulers, there may be arranged a slidable sleeve member 12 having an appropriate colour and adapted to serve as an index or as a member operative to actuate the luminous or sound signalling system by means of a device to be described later.

Within the tube or ruler 4 are slidably mounted a pair of semi-cylindrical graduated rulers 13 and 14 carrying suitable indications. On the tube, there may be secured, by any appropriate means, signs or designs in colour or not, of predetermined length corresponding to a given operation or a working time, their length being proportional to the time planned. The pair of semi-cylindrical rulers 13 and 14 are thus slidable relatively to each other on one hand, and relatively to the design-carrying tube on the other hand.

Rulers provided with scales 15 and having pointers 17 are mounted on the frame 1 parallel to the generatrices of cylinder 2 in order to effect readings thereon by comparison, as for instance analyses, time studies and the like.

At the lower part of the frame, there is provided a carriage 19 riding on a pair of rails 18 and driven by a screw 20, for instance. Said screw is driven by a constant speed mechanism 21, such as a synchronous electric motor or a clock work mechanism. A time-keeper or clock provides for the indication of time. The movement of the carriage 19 is effected at a speed proportional to time.

Figure 8:
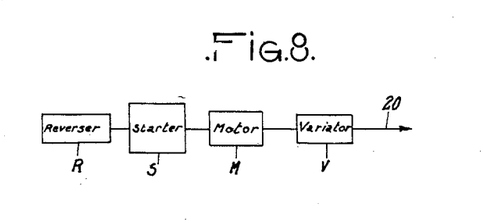
Fig. 8 shows diagrammatically the device allowing the return of the sensing device to its starting position.

Said carriage is connected to the screw by a nut, which is separable into two portions for instance under the action of a hand lever, which enables the operator to position the carriage at a desired location on the screw. For returning the carriage 19 to its starting position upon reaching the end of its travel, the mechanism 21 comprises, as illustrated in Fig. 8 a reverser R connected to a starter S and which operates to change the direction of rotation of an electric motor M. Said motor drives the screw 20 by means of a variator V allowing to adjust the angular speed of said screw 20 according to a predetermined law of time during the operation of the carriage 19 and to return rapidly said carriage to its starting position by acting upon the reverser R.

The carriage 19 carries a mechanism for the reading of the indications supplied by the slidable sleeves 12 and the signal-actuating markers 12a, and transmits the results of such readings to an appropriate transmitter supplying visible or audible signals.

Figure 9:
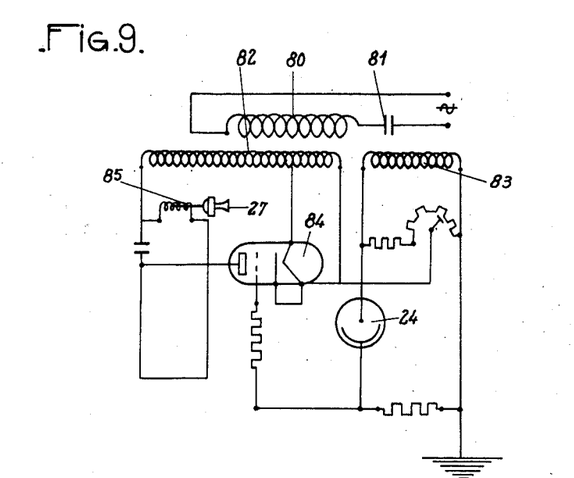
Fig. 9 shows the electrical circuit associated to the sensing device and the signaling means.

The reading and transmitting mechanism may comprise, as shown in Fig. 2, a projector 23 and a photo-electric cell 24, the current output of which is transmitted by flexible leads 25 to an amplifier 26 actuating a signalling device 27, not shown. As illustrated in Fig. 9, the electrical circuit associated to the photo-electric cell 24 and to the signaling device 27 comprises a transformer 80, the primary winding of which is protected by a capacitor 81 and provided with a twin-secondary winding 82 and 83. The secondary winding 83 feeds the photo-electric cell 24 which, when lighted, supplies the grid of a triode 84 acting as amplifier stage for energizing a relay 85 controlling a signaling device 27, such as audible or visible signal. The triode 84 is fed by means of the secondary winding 82. To increase the life of the photo-electric cell, the apparatus and the adjustable indexes 12 and 12a are respectively dark and white, so that the cell becomes only operative whenever the spot encounters one of said white indexes, thus generating energization of the relay 85.

Said carriage may carry indexes 28 and 29 movable therewith, in registry with the grooved cylinder 2.

Likewise in registry with cylinder 2, there are arranged, parallel to the latter, one or more cylinders 30 carrying scales or abacuses rotatable about their axes 31 and which may be stopped in a desired position by a set screw 32. The axis of cylinder 30 is rotatably mounted in a bearing 33 formed in the shape of a slot, thereby making it possible to move cylinder 30 away from the cylinder 2 when rotated, and towards the latter when a reading is to be made.

A slidable transparent sleeve 34 carrying a scale and adapted to form a vernier may be mounted with a friction fit on the cylinder 30.

At the upper portion of frame 1, there is arranged a totaliser 35 for the distances measured along the cylinder 2 by means of pointers 36 movable along the totaliser. Said totaliser 35 may be constituted by a bar 37 mounted for sliding and rotational movement in the frame, and carrying the removable pointers 36, which are likewise mounted for sliding and rotation, but which may be secured against the bar by means of screws 38.

The apparatus thus constituted offers a very wide range of possibilities. A brief disclosure of its operation will make clear in which way it may be put to use.

To each of the tubes 4 there corresponds a worker of the workshop, or a workshop of the plant. The length of tubes 4 is proportional to, but greater than, the working time corresponding to a wage period. In front of the movable time scale secured to the semi-cylinder 13, the operator adjusts the semi-cylinder 14 carrying the scale of hourly wages. The labels are cut out at a length corresponding to the times necessary for the operations to be carried out by the worker or the workshop, all useful data being carried on said labels, fixed or glued to the tube partly covering both scales. At the end of his job, or slightly before, the worker requires to be re-supplied. A bushing 12 will be arranged at the corresponding predetermined point. The same operation is carried out for all of the tubes 4 designating workers or workshops, and said tubes are then secured upon the cylinder. The zero indication on the time scales, on the work scales, on the wages scales and on the true time scales as carried upon the cylinder 30, are coinciding.

The apparatus being started when work is started in the workshops, if everything progresses normally, the carriage 19 moves along the rails 18 under the action of the screw 20 proportionally to time. The projector 23 forms on the cylinder a luminous spot which, being reflected by the cylinder 2, energises the photoelectric cell 24. The cylinder 2 being rotated at a rate determined as desired by the operator, the spot scans the entire surface of said cylinder and consequently the surfaces of rulers 4 secured thereto.

Whenever the spot encounters a bushing 12 or marker 12a, the cell, being de-energized, transmits through the agency of amplifier 36 an audible or visible command to the supervisor reminding him that a supply or a product removal is due for one of the workers or workshops. Thus the apparatus provides at the required times commands relating to handling operations for instance, and checking of the work performed at predetermined times. When a worker is late or fast with his work, it is possible, by simply displacing the related ruler 4 with respect to the time scale and in a direction parallel to the generatrices of cylinder 2, to readjust the position of said ruler 4 and to ensure a subsequent handling operation at the desired moment.

The operator sees, for example, at the end of the time corresponding to the predetermined wage, that labels relating to the non-completed jobs extend beyond the time scale 13. In that case, they have, for example, not been paid for. They should consequently be carried over to the next payment. The time scale being positioned on the ruler and the ruler positioned in the cylinder, the labels are secured in such a way as to cause the previous limit reached by the index on the label to register with the zero of said scale. The wages scale 14 is then pushed back so as to cause the zero thereof to register with the starting point of said labels. The scale of wages due remains from that time on always in registry with the time scale 13. Said scales 13 and 14 may be rotated about themselves within the tube so as to cause either the scale 13 or the scale 14 to assume positions which facilitate a reading operation by extending under the labels.

It is thus possible, at any time, to read the amounts due to the workers.

In one modification, small totalising counters placed on the cylinder and corresponding to each tube ensure a greater accuracy in keeping up to date the wages account for each worker.

At the end of the wage period, the mere reading of the displacements of the tubes and scales provides an indication of the total gains or losses in time for each individual worker or workshop, making it possible to determine the bonuses or fines relating to such gains or losses by a direct reading on the corresponding scales and totalisers and the tubes of cylinder 2. Similarly by making a comparison with the scales of cylinder 30, a simple reading makes it possible to determine the wages by job, contract wages, or others, at the suitable rates at which the individual workers or workshops are working.

An examination of cylinder 2 makes it possible to visualise the jobs in progress, the point they have reached, the time which separates them from completion, and a comparison with the various scales gives a reading of the corresponding costs, wages, bonuses or fines which are to be paid out or held back, and so on.

The totaliser 35 permits of making up the sums total of all the said quantities, lineally and, by comparison with the various scales, to check the technical and financial situation as regards the workshop or the concern, at any time. The sliders or indexes constitute mnemotechnic marks for all such operations. For this purpose, the bar 37 is pivoted around its axis so that the pointers 36 register one assembly of scales carried by the cylinder 2 or by one of the cylinders 30. Assuming the total wages for a workshop must be determined during a period of time shorter than the predetermined period of time of the apparatus. The second pointer 36 from the right is located on the bar 37 at a point corresponding to the end of the white label relating to the last elementary operation performed by a first worker accordingly to the corresponding wage scale, while the first pointer registers the beginning of said wage scale. Then, the third pointer is located on bar 37 at a distance from said second pointer equal to the length of the wage scale corresponding to a second worker and relating to the distance from said scale origin to the end of the white label relating to the last elementary operation performed by said second worker. When the location of all necessary pointers 36 is ended, the distance between the first and the last pointers represents the requested total wages measured at a scale corresponding to that of the wage scales.

The clock or time-keeper 22 makes it possible to readjust the position of carriage 19 in the event of an interruption in operations. The connection of the screw with the driving motor may be effected by means of a gearing imparting to the carriage a desired speed, which may be varied by changing the gearing.

In one modification of the apparatus, the indexes 28 and 29 may be replaced in the following way: an electronic tube, such as a Wood luminous projector, projects onto the cylinder 2 a beam which acting upon a suitable photo-sensitive material arranged on said cylinder, causes the latter to glow with a certain persistency. The cylinder 3 in its rotation then carries a position indicating pencil of light, depending upon the persistency of the light. The labels may also be luminescent so as to facilitate the readings and manual adjustments.

In the same way, the carriage carrying the reading device could be provided with several cells and projectors adapted to transmit commands of different character and select such commands according to the character or the colour of the corresponding markers.

The means for transmitting orders may be of any suitable type; they may be e. g., instead of by photo-electric cells, constituted by mechanical devices or electric contacts.

The automatic control of the slidable parts of the movable scales may be effected by means of a mechanism illustrated in Figs. 10 and 11 and which will now be described:

The movable scales are carried by a movable cylinder displaceable by means of pressure fluid.

The movable metallic cylinder 41 carries at the end thereof packings maintained by means of split-rings 42 for instance. The packing is made of insulating material such as ebonite and surrounds the piston rod 43, the end 44 of which is unitary with side flanges constituting the ends or bottom walls of the rotatable cylinder of the machine.

The packing comprises three parts 45, 46, 47 fitted onto each other and between which are clamped leather washers engaging rod 43 and maintained clamped on said rod by resilient ring members 49.

Similarly, the fixed control piston is formed of three parts of insulating material 50, 51, 52, fitted onto each other and bolted by means of a nut 43 to the end 44 of the piston rod.

Leather washers 55, held by resilient rings 56 against the inner side face of the movable tube 41, insure a tight seal.

The space 52a between part 45 and part 52 is sealed; it may be supplied with compressed air for instance through aperture 57 connecting said space with the axial compressed air inlet 58 formed in the piston rod.

In order to restrict the movements of cylinder 41, an insulated stop 59 is provided on the piston rod 44, freely slidable thereon. A yoke-shaped abutment 60, including two metallic flanges slidable with an easy friction fit on the piston rod 44, is retained on said piston rod by the clamping action of a screw 61, the head of which is formed with a recess 62 adapted to receive an operating key and the end of which bears against a ring 63 within which is arranged an insulating split bushing 64.

Adjustment of said screw 61 displaces the bushings 63, and the split bushing 64, firmly clamping the piston rod, is operative to block the abutment. When the cylinder 41 is impelled by compressed air, the last of the seal engages the member 59 which in turn is prevented from sliding by the abutment 60; the displacement is therefore restricted positively and accurately.

The cylinder is slidable within recessed members 65 and carries a rib 66 engaging a complementary groove 67 formed in the members 65. Wedging blocks 68, symmetrically arranged between two consecutive cylinders, are retained centrally of the large rotatable cylinder by resilient securing means 69 and springs 70. The blocks 68 carry channels 79 adapted to contain scales, which channels are secured by screws 72. Said scales are cinematograph films of standard size cut in two along their longitudinal axis and on which suitable graduations have been photographically recorded. The movable cylinder 41 carries supports 73 on which are secured three channels 71 by screws 72.

The bushings actuating the photo-electric cells of the machine are in the present instance replaced by flanges 74 made of resilient material and shaped for engagement on channels 71.

The movable cylinder 41 is metallic, and so is the piston rod 44. The pistons and the packings are made of insulating material. Each cylinder with its related pair of piston rods thus provides a pair of condensers, the capacitance of which is variable as a function of the position of the movable cylinder with respect to both said piston rods.

Figure 13:
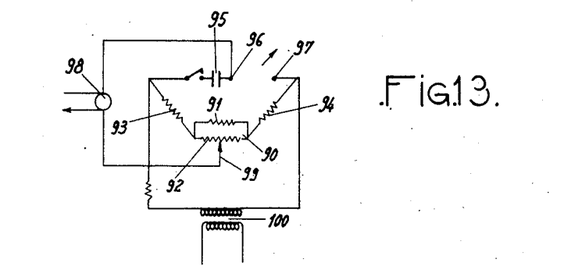
Fig. 13 is a diagram of the capacitance measuring device.
Figure 14:
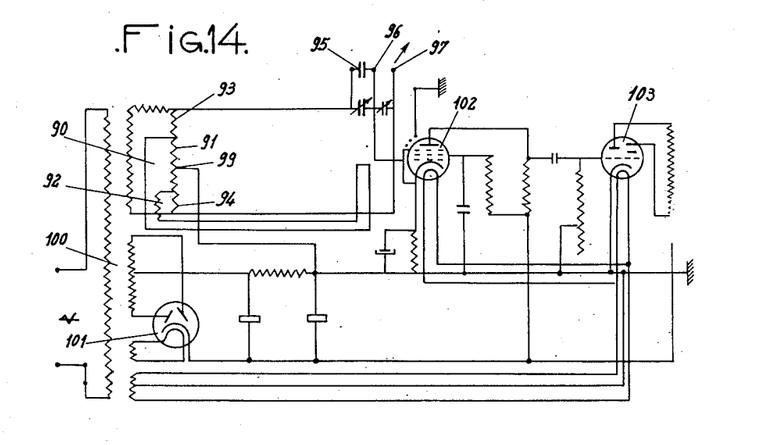
Fig. 14 shows an embodiment of a capacitance measuring device according to Fig. 13.

A convenient way of measuring and determining the relative position of all the movable cylinders with respect to all the piston rods may therefore consist in measuring, by any suitable means, the capacitance of the condensers which is thus obtained. It is therefore possible, at a distance, instantaneously and at any desired moment, to measure the extent of displacements of the cylinders 41 as determined by the abutment 60 and which are representative of the gains and losses of time in the accomplishment of the jobs. By separate and combined measurements effected with the indicating bridge with suitable alternating currents supplied to the condensors by means of suitable contact means, it is possible to determine either the gains of time alone, or the losses alone, or any other desired indication. As illustrated in Figs. 12 to 14, such a capacitance measuring device acts to determine the percentage of the capacitance to be measured with respect to standard capacitance.

It comprises a bridge having a potentiometer 90 formed by two resistors 91 and 92 mounted in parallel, two auxiliary resistors 93 and 94 mounted in series on both sides of said potentiometer, a standard capacitor 95, two terminals 96 and 97 for connecting the capacitance $Cx$ to be measured and an electronic device 98 connected, on one hand, to the slider 99 of the potentiometer 90 and, on the other hand, to the common of the two capacitances. Said bridge is supplied by means of a transformer 100 provided with a multiple secondary winding for feeding said electronic device. The percentage of the capacitance $Cx$ with respect to that of the capacitor 95 is determined by reading on the scale in front of which moves the slider 99 when the electronic device 98 indicates balancing.

Said electronic device comprises, as illustrated in Fig. 13 a twin diode 101, an amplifier provided with a pentode 102 the characteristic of which has a great slope and a cathodic indicating device 103, such as cathodic eye.

When applied to the apparatus according to the invention, as illustrated in Fig. 14, a reverser 104 acts to connect at will the terminals 96 and 97 to the right side or to the left side of the apparatus with respect to the movable cylinders 41 with a view to measure the relative capacitances on the right side and on the left side of the assembly: movable tubes 41—piston rods 43 whereby the losses or the gains are determined.

Figure 15:
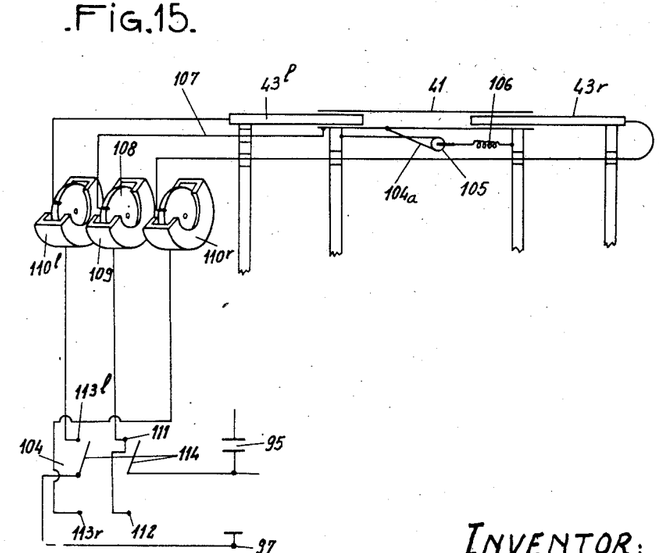
Fig. 15 shows the application of the device illustrated in Fig. 14 to an apparatus according to the invention.

On the rib 66 of the movable tube 41 (see also Fig. 10) is fitted a rope 104a engaging a floating pulley 105 maintained by a release spring 106. Said rope is electrically connected to a wire 107 which in turn is connected to the rotating disk 108 of a mercury rotating permanent switch 109, known per se. The stationary piston rods 43r and 43l are similarly connected to mercury rotating permanent switch 110r and 110l. The switches 109, 110r and 110l are driven by the rotary shaft of the main cylinder and are respectively connected to the terminals 111 and 112, 113r and 113l of the reverser 104. When acting on twin lever 114 switch on terminals 111 and 113r the measure of the capacitance on the right side of the apparatus is operable; reversely said measure is operable on the left side of the assembly when switching on terminals 112 and 113l.

What I claim as my invention and desire to secure by Letters Patent is:

1. In a machine for checking the progress of work, for controlling and organizing work, said work being made either by a workman, or a workshop or a plurality of workshops, in combination, a control member, a plurality of parallel scale assemblies carried by said control member for constituting a plan of work for a predetermined period, each one of said assemblies being allocated to a controlled work and comprising scales fixed with reference to said control member and scales movable with reference to said fixed scales in the longitudinal direction of said parallel scales to allow the adjustment of their graduation, signs representative of work respectively placed by an operator in relation to said assemblies, movable means for detecting said signs, means for displacing said movable means adjacent said control member according to a movement proportional to time, signaling devices placed at a distance from the machine, means for transmitting to said signaling devices indications of the presence of a sign when detected by said movable means, and means for returning said movable means to its initial position at the end of said period.

2. In a machine for controlling the total work made either by a workshop, or a plurality of workshops, said total work comprising a plurality of concurrently progressing works respectively made by a workman or a workshop, in combination, a control member; and a plurality of parallel scale assemblies carried by said control member and constituting a plan of total work for a predetermined period, each one of said assemblies being allocated to a progressing work and comprising scales fixed with reference to said control member and scales movable with reference to said fixed scales in the longitudinal direction of said scales for simultaneously indicating for said progressing work, at any time during said period, the production allotted to the series of operations already executed and the pay due for said executed operations since the beginning of said period.

3. In a machine for controlling the total work made either by a workshop, or a plurality of workshops, said total work comprising a plurality of concurrently progressing works respectively made by a workman or a workshop, in combination, a control member; a plurality of parallel scale assemblies carried by said control member and constituting a plan of total work for a predetermined period, each one of said assemblies being allocated to a progressing work and comprising, on one hand, a part considered as fixed on the control member, a scale of time and a scale of efficiency belonging both to said fixed part with respect to which said scale of efficiency is displaceable in the longitudinal direction of said scales, and, on the other hand, a part movable with reference to said fixed part in the longitudinal direction thereof and a set of scales belonging to said movable part and having at least a time scale displaceable with respect to said movable part in said longitudinal direction, said movable part having a mark to be put in coincidence with the zero of said efficiency scale at the beginning of each predetermined period while said displaceable time scale is moved at such a beginning so that its zero coincides with the origin of the fixed scale of time; and a plurality of sets of labels respectively representing the operations to execute and having a graduation coincident with that of the scale of time carried by the machine, each label of each set having a length proportional to the theoretic time allowed for the execution of the operation corresponding to said set, the first one of the labels of each set being positioned by an operator in relation to the movable time scale so that its origin coincides with the end of that one of said first labels which precedes it for the same progressing work in a direction parallel to said scales, while the other labels of said set are positioned by an operator in relation to said movable scales in such a manner that their terminal ends correspond to the moment of the actual finish of the work they represent, whereby the sliding of the movable part relatively to the fixed part for placing the end of said first label in coincidence with the graduation of the fixed time scale which bears the same number as that which marks the actual finish of the work on the movable time scale enables to read the efficiency of work on the graduation of said efficiency scale which coincides with said mark.

4. A machine, according to claim 3, wherein the movable part comprises a displaceable scale of time, a displaceable scale of salaries and a displaceable totalizer scale of hours, the fixed and displaceable scales of time being graduated according to the daily hours, the hours of the beginning and finish of work coinciding, whereby, at the end of a pay period, each finished work is evaluated and paid by direct reading of the wage on the corresponding salaries scale in relation to the last first label corresponding to a job completely finished, a similar first label to that corresponding to the unfinished work being carried to the other end of the corresponding movable part, the corresponding salaries scale being displaced on said movable part so that its zero coincides with the origin of the work remaining to be paid, the corresponding totalizer scale of time being displaced on said movable part so that its zero coincides with the origin of work still to be done, and the corresponding scale of efficiency at the same moment being displaced on the corresponding fixed part so that its zero coincides with the index carried by said movable part without the latter having to be moved to the course of the preceding operations.

5. A machine, according to claim 4, wherein the fixed and movable scales are supported in grooves respectively formed on the fixed and movable parts, in which grooves said scales may be held in any position at will.

6. A machine, according to claim 3, further comprising an auxiliary member carrying auxiliary scales, which member can be moved to align the auxiliary scales thereon with any one of the scales which are carried by the control member.

7. A machine, according to claim 3, wherein the scales are photographed on films of photosensitive material.

8. A machine, according to claim 3, wherein each movable part of each assembly comprises a cylinder, supports resiliently mounted on said cylinder, a movable tube guided by said supports, two fixed pistons for carrying said movable tube and the rods of which are fixed at their extremities on the ends of the control member, packings secured on said tube and through which respectively pass said rods, means for moving said tube, and means for stopping said tube.

9. A machine, according to claim 8, wherein the rod of each fixed piston is formed with an axial bore which opens out at one extremity into the space made up between the head of said piston and the corresponding packing integral with the corresponding movable tube, the other extremity of the bore having an opening by which a fluid is admitted under pressure to operate said movable tube.

10. A machine, according to claim 8, wherein the stopping means comprises a split ring surrounding the corresponding piston rod, an adjustable stop housing said split ring and a screw fixed on the control member for clamping said adjustable stop on said rod.

11. A machine, according to claim 8, further comprising means for measuring and determining the relative position of all the movable tubes with respect to all the piston rods, whereby the gains and the losses of time in the accomplishment of the concurrently progressing works are obtained.

12. A machine, according to claim 11, wherein the movable tubes and the piston rods are made of electrically conductive material while the pistons and the set of packings are covered with electrically insulating material as well as the adjustable stops of the tubes, and wherein the means for measuring the relative position of said tubes and said pistons comprise a plurality of circuits, each of said circuits having an element formed by one movable tube and one of its corresponding pistons, and means for indicating the capacitance variations in said circuits according to the relative position of said movable tubes and said pistons.

13. A machine, according to claim 12, wherein the indicating device comprises an electronic capacitance measuring device and a selecting contact for connecting said measuring device with the circuits having the pistons positioned on the same side of the machine, then with the circuits having the pistons positioned on the other side of said machine with a view to determine the difference existing between the two thus measured capacitance values, whereby losses or gains of time are determined.

14. In a machine for controlling and organizing the total work made either by a workshop, or a plurality of workshops, said total work comprising a plurality of concurrently progressing works respectively made by a workman or a workshop, each one of said progressing works being formed by the succession of operations, in combination, a control member; a plurality of parallel scale assemblies carried by said control member and constituting a plan of total work for a predetermined period, each one of said assemblies being allocated to a progressing work and comprising scales fixed with reference to said control member and scales movable with reference to said fixed scales in the longitudinal direction of said scales for simultaneously indicating for said progressing work, at any time during said period, the production allotted to the series of operations already executed and the pay due for said executed operations since the beginning of said period; a plurality of signs, each one of said signs being placed by an operator in relation to one of said assemblies during the execution of an operation of the corresponding progressing work according to the moment of the actual finish of the preceding executed operation and being representative of the supplying step of the corresponding following operation; movable means for detecting said signs, means for displacing said movable means adjacent said control member according to a movement proportional to time, signaling devices placed at a distance from the machine, means for transmitting to said signaling devices indications of the presence of a sign when detected by said movable means, and means for returning said movable means to its initial position at the end of said period.

15. In a machine for controlling and organizing the total work made either by a workshop, or a plurality of workshops, said total work comprising a plurality of concurrently progressing works respectively made by a workman or a workshop, each one of said progressing works being formed by the succession of operations, in combination, a control member; a plurality of parallel scale assemblies carried by said control member and constituting a plan of total work for a predetermined period, each one of said assemblies being allocated to a progressing work and comprising, on one hand, a part considered as fixed on the control member, a scale of time and a scale of efficiency belonging both to said fixed part with respect to which said scale of efficiency is displaceable in the longitudinal direction of said scales, and, on the other hand, a part movable with reference to said fixed part in the longitudinal direction thereof and a set of scales belonging to said movable part and having at least a time scale displaceable with respect to said movable part in said longitudinal direction, said movable part having a mark to be put in coincidence with the zero of said efficiency scale at the beginning of each predetermined period while said displaceable time scale is moved at such a beginning so that its zero coincides with the origin of the fixed scale of time; a plurality of sets of labels respectively representing the operations to execute and having a graduation coincident with that of the scale of time carried by the machine, each label of each set having a length proportional to the theoretic time allowed for the execution of the operation corresponding to said set, the first one of the labels of each set being positioned by an operator in relation to the movable time scale so that its origin coincides with the end of that one of said first labels which precedes it for the same progressing work in a direction parallel to said scales, while the other labels of said set are positioned by an operator in relation to said movable scales in such a manner that their terminal ends correspond to the moment of the actual finish of the work they represent, whereby the sliding of the movable part relatively to the fixed part for placing the end of said first label in coincidence with the graduation of the fixed time scale which bears the same number as that which marks the actual finish of the work on the movable time scale enables to read the efficiency of work on the graduation of said efficiency scale which coincides with said mark; tokens slidably mounted on said movable parts and each one of said tokens being placed by an operator in relation to one of said assemblies during the execution of an operation of the corresponding progressing work according to the moment of the actual finish of the preceding executed operation and being representative of the supplying step of the corresponding following operation; movable means for detecting said tokens, means for displacing said movable means adjacent said control member according to a movement proportional to time, signaling devices placed at a distance from the machine, means for transmitting to said signaling devices indications of the presence of a token when detected by said movable means, and means for returning said movable means to its initial position at the end of said period.

16. A machine, according to claim 15, wherein the control member is formed as a rotary cylinder having uniformly spaced grooves extending parallel to the axis of said cylinder, said grooves respectively housing the movable parts in sliding relationship, the fixed parts being secured on the surface of said cylinder between said grooves.

17. A machine, according to claim 16, further comprising an auxiliary cylinder independently rotatable, extending parallel to the axis of the main cylinder and carrying auxiliary scales, which auxiliary cylinder can be moved to align the auxiliary scales thereon with any one of the scales which are carried by the main cylinder.

18. A machine, according to claim 15, wherein the control member is furnished with a fluorescent coating, and wherein the detecting and transmitting means comprise a projector projecting a narrow beam of light on the control member, a photo-electric cell adapted to receive the light reflected by the control member which fluoresces under the action of the projected light, an electrical circuit connected with said photo-electric cell, an amplifier inserted in said circuit, and means for connecting said amplifier with the corresponding signaling device, whereby said signaling device is operated whenever said beam encounters any one of the adjustable tokens in the detecting movement, which fact generates a de-energization of the cell and a consecutive variation of current flow through said circuit.

19. A machine, according to claim 15, wherein the means for displacing and returning the detecting means comprises a constant speed mechanism, a screw parallel to the control member and driven by said mechanism, a pair of rails parallel to said control member, a carriage riding on said pair of rails, a nut fixed on said carriage and engaging said screw, said nut being releasable with respect to said screw for enabling the operator to position said carriage at a desired location on said screw, and a reverser connected with said mechanism.

NOURHAN KUTCHUKIAN.

REFERENCES CITED

The following references are of record in the file of this patent:

UNITED STATES PATENTS

| Number | Name | Date |
| --- | --- | --- |
| 357,373 | Cushing | Feb. 8, 1887 |
| 1,007,415 | Bates | Oct. 31, 1911 |
| 1,131,104 | Avram | Mar. 9, 1915 |
| 1,340,216 | Diepenbrock | May 18, 1920 |
| 1,713,276 | Goeckler | Mar. 14, 1929 |
| 1,801,129 | Warren | Apr. 14, 1931 |
| 2,080,330 | Ottaway | May 11, 1937 |
| 2,321,971 | Becker | June 15, 1943 |